Aug. 17, 1965  E. L. GUTKNECHT  3,200,503
SINE GAGE
Filed Feb. 13, 1962
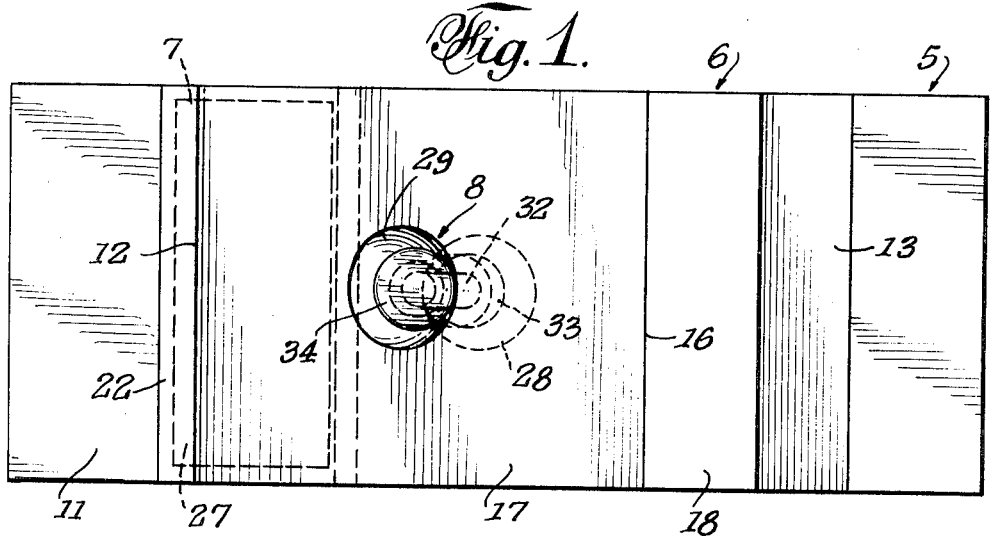
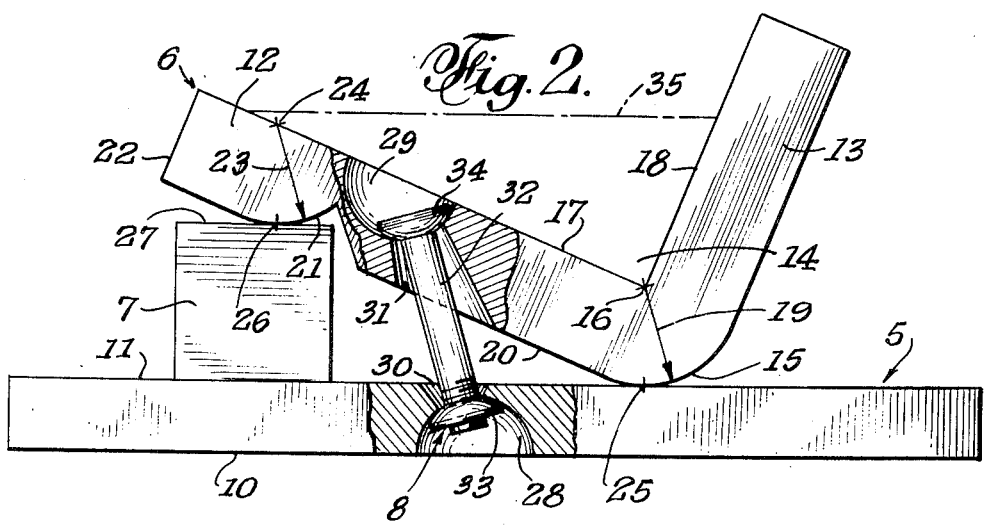
INVENTOR.
EDWARD L. GUTKNECHT
BY C. L. Stratton
ATTORNEY

United States Patent Office 3,200,503
Patented Aug. 17, 1965

3,200,503
SINE GAGE
Edward L. Gutknecht, Norwalk, Calif.
(11434 Planett St., Downey, Calif.)
Filed Feb. 13, 1962, Ser. No. 173,069
2 Claims. (Cl. 33—174)

This invention relates to a sine bar gage or fixture, the same having the usual purposes of measuring and/or checking the accuracy of the angular relationship of the surfaces of a piece of work.

The present invention is characterized by simplicity and low cost of a sine bar gage and it is an object of the invention to provide a simplified construction which, therefore, may be economically produced.

Another object of the invention is to provide a sine bar fixture that, because the same is provided with a one-piece gage element, has greater accuracy than such an element assembled from several components and, moreover, has greater stability and accuracy in use.

A further object of the invention is to provide an adjustable sine bar gage that, in addition to the usual purposes of gaging and measuring angles of a piece of work that has one right angle, disposes said angle, regardless of adjustment of the bar, at a constant position from the top of a supporting base, thereby enabling quicker set-up and more accurate gaging operation.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a plan view of a sine bar gage according to the present invention.

FIG. 2 is a side elevational view thereof, with portions in section.

The sine bar gage that is illustrated comprises, generally, a base 5, a sine bar 6 mounted on said base in angular adjusted position according to the height of a gage block 7 interposed between said base and sine bar, and means 8 to lock the adjustment. The gage block 7, per se, forms no part of the present invention; the same, while shown as a single element, is representative of one block or two or more blocks in stack relation and is selected according to the angle to be determined according to its sine function. The thickness or height of the gage block 7 has an indicated ratio to the effective length of the sine bar between its two points of support.

The base 5 is shown as a rectangular plate having lower and upper parallel faces 10 and 11, respectively. The upper face 11 should be accurately flat, although the surface may be interrupted for lightening and other purposes.

The sine bar 6 preferably comprises a one-piece member having a leg 12 and a normal leg 13 to form an angle, it being essential that the included angle 14 be an accurate right angle.

While in practice the thickness of legs 12 and 13 may vary, it is important to the invention that the outside bearing corner 15 where the outer faces of the legs meet be generated on an arc around the inside corner 16 where the inner faces 17 and 18 of the respective bar legs 12 and 13 join. It will be clear that, through a range of 90° or any desired portion thereof, the bar 6 may be rocked on said outside corner 15 and that in all rocked positions, the corner 16 has a constant distance from the base surface 11 relative to which the sine bar is operatively rocked. The radius 19 indicates that at least insofar as the bar leg 12 is concerned, the lower or outer face 20 of said leg and the upper or inner face 17 are parallel. Hence, when the sine bar is disposed flatwise on the base face 11, the face 17 of said bar will be parallel to the base face 11 and spaced therefrom the distance 19.

According to the invention, a convex arcuate bearing corner 21 is formed in the lower face 20 of the leg 12 in spaced relation to the corner 15 and, as shown, preferably nearer the end 22 of said leg than to the corner 15. Said corner 21 is generated on an arc having a radius 23 with its center 24 on the sine bar face 17. It will be clear that said radii 19 and 23 are exactly the same size and that the arcs 15 and 21 are exactly alike.

From the foregoing, it will be evident that the respective bearing points of tangency 25 and 26 of the arcuate faces 15 and 21 with the surface 11 of the base and the surface 27 of a gage block 7 will be equal to the spacing from each other of the generation points 16 and 24, and that said spacing of the points of tangency remains constant for all angular positions of the sine bar relative to the base.

The locking means 8 is shown as a spherical seat 28 in the under side of the base 5 and preferably midway between the sides thereof, a spherical seat 29 in the upper side of the sine bar leg 12, respective flared openings 30 and 31 extending from said spherical seats through the base and leg 12, respectively, and a locking bolt 32 that extends through said openings and has a spherical nut 33 engaged with seat 28 and a spherical head 34 engaged with seat 29. It will be seen that said locking bolt draws the sine bar down onto the base face 11 to engage said face and the face 27 of a gage block 7 in the manner above described.

Since the bolt 32 is the only connecting means between the base and the sine bar, the block 7 may have any desired position on the base, providing face 27 thereof is engaged by the arcuate corner 21. Also, as the angle of adjustment between the base and sine bar is changed, the angle of the bolt 32 will change accordingly and there will be a corresponding shift of the sine bar relative to the base. In other words, the point of tangency 25 will shift, as will the position of the block 7 and the point of tangency 26. Yet the relationship of said points remains constant, as does the spacing of corner 16 relative to base face 11.

When gaging a work piece having a right angle corner disposed in the angle 14 of the bar 6 and its sides bearing on the faces 17 and 18, the face 35 of said work piece is the one ordinarily checked by a height gage, for instance. Since the corner 16 is at a constant distance from face 11, the height gage, once its relationship to the work piece face 35 has been established, does not require to be readjusted for any change in the lateral position of the sine bar. The same height block 7, regardless of shifts in its lateral position engaged with the corner 21, will always bring the sine bar to an angular position in which the face 35 of a work piece may be gaged by a pre-set, undisturbed height gage. It will be evident that, in prior sine bars that use cross pins for adjusting the position thereof, the point comparable to the present corner 16 does not maintain a constant relationship to the base face, but rises and lowers because the fulcrum keeps changing with changes of angle of the sine bar.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a sine gage having a base with a flat support face upon which a gage block is adapted to be positioned with one gage face thereof on said support face and a parallel gage face thereof elevated according to the height of the block,
   (a) in sine bar of uniform thickness having an upper gaging surface and a parallel lower surface and provided with longitudinally spaced arcuate bearing surfaces that are formed in said lower surface, the radii of the arcuate bearing surfaces and the thickness of the sine bar being equal,
   (b) the centers of generation of curvature of said bearing surfaces being located on the upper gaging surface of the sine bar,
   (c) one of said arcuate surfaces being in tangential bearing engagement with the support face of the base and the other being in tangential bearing engagement with the elevated gage face of the gage block, and
   (d) means to adjustably connect the base and sine bar.

2. In a sine gage having a base with a flat support face upon which a gage block is adapted to be positioned with one gage face thereof on said support face and a parallel gage face thereof elevated according to the height of the block,
   (a) a sine bar of uniform thickness having an upper gaging surface and a parallel lower surface and provided with longitudinally spaced arcuate bearing surfaces that are formed in said lower surface, said sine bar further having an integrally formed leg with a surface normal to the gaging surface of the bar,
   (b) the centers of generation of curvature of said bearing surfaces being located on the upper gaging surface of the sine bar, the center of generation of one bearing surface being located at the corner where said gaging and normal surfaces meet,
   (c) one of said arcuate surfaces being in tangential bearing engagement with the support face of the base and the other being in tangential bearing engagement with the elevated gage face of the gage block, and
   (d) means to adjustably connect the base and sine bar.

References Cited by the Examiner

UNITED STATES PATENTS

| | | | |
|---|---|---|---|
| 2,446,562 | 8/48 | Trbojevich | 33—174 |
| 2,447,889 | 8/48 | Adler | 33—174 |
| 2,645,026 | 7/53 | Trbojevich | 33—174 |
| 2,645,067 | 7/53 | Hinderer | 33—174 |
| 2,649,785 | 8/53 | Sirko | 33—174 |

LOUIS R. PRINCE, *Primary Examiner.*

ISAAC LISANN, *Examiner.*